(12) United States Patent
Pope et al.

(10) Patent No.: US 6,743,093 B1
(45) Date of Patent: Jun. 1, 2004

(54) AUXILIARY DRIVE FOR COMBINE AUGERS FOR CLEANOUT

(75) Inventors: Glenn E. Pope, Viola, IL (US); John P. Vandevoorde, Lynn Center, IL (US); Ryan S. Herlyn, Prophetstown, IL (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/309,977

(22) Filed: Dec. 4, 2002

(51) Int. Cl.$^7$ ............................................. A01F 12/46
(52) U.S. Cl. ...................... 460/114; 460/23; 460/103; 460/119
(58) Field of Search ............... 460/23, 103, 114, 460/119, 149, 150; 198/493, 494, 495

(56) References Cited

U.S. PATENT DOCUMENTS

| | | | |
|---|---|---|---|
| 3,561,681 A | * | 2/1971 | Tyler ............................ 239/663 |
| 3,575,306 A | * | 4/1971 | Obermeyer et al. ......... 414/523 |
| 3,872,982 A | * | 3/1975 | Rowland-Hill et al. ...... 414/326 |
| 4,037,745 A | | 7/1977 | Hengen et al. |
| 4,138,837 A | | 2/1979 | Love |
| 4,253,946 A | * | 3/1981 | Ludwig ........................ 209/283 |
| 4,430,847 A | | 2/1984 | Tourdot et al. |
| 4,467,590 A | | 8/1984 | Musser et al. |
| 4,470,243 A | | 9/1984 | Rayfield |
| 4,512,139 A | | 4/1985 | Musser et al. |
| 4,714,398 A | | 12/1987 | Rohwedder |
| 4,759,185 A | | 7/1988 | McConnell et al. |
| 4,843,803 A | | 7/1989 | Teijido et al. |
| 4,888,940 A | | 12/1989 | Deutsch |
| 4,967,863 A | | 11/1990 | Teijido et al. |
| 5,409,344 A | * | 4/1995 | Tharaldson ................... 414/505 |
| 5,527,218 A | | 6/1996 | Van den Bossche et al. |
| 5,655,872 A | * | 8/1997 | Plotkin ......................... 414/526 |
| 6,508,705 B1 | * | 1/2003 | Van Overschelde ........... 460/23 |

FOREIGN PATENT DOCUMENTS

| | | | |
|---|---|---|---|
| JP | 11137064 A | * | 5/1999 |
| JP | 2001028938 A | * | 2/2001 |

OTHER PUBLICATIONS

Drawing of Prior Art Auger Casting and Drain Opening Closure Plate Arrangements, 2 sheets (Admitted Prior Art).

* cited by examiner

*Primary Examiner*—Robert E. Pezzuto
*Assistant Examiner*—Nathan Mammen
(74) *Attorney, Agent, or Firm*—The Law Office of Randall T. Erickson, P.C.

(57) ABSTRACT

An auxiliary rotary drive for at least one auger that in normal operation is rotatable to transport grain from a grain tank of a harvesting apparatus. The auxiliary rotary drive is configured to rotate the at least one auger during cleanout to assist air nozzles or other means to remove residual grain or residue from the harvesting apparatus. The auxiliary rotary drive can be arranged to transfer power to the auger via a clutch arrangement arranged between the auxiliary rotary drive and the auger. The auxiliary rotary drive turns the auger at a speed slower than a normal operating speed of the auger.

20 Claims, 8 Drawing Sheets

AUXILIARY DRIVE FOR COMBINE AUGERS FOR CLEANOUT

TECHNICAL FIELD OF THE INVENTION

The invention relates to harvesting apparatus, such as combines. Particularly, the invention relates to a cleanout system for a harvesting apparatus.

BACKGROUND OF THE INVENTION

Horticultural crops may be classified as edible crops, inedible crops, genetically modified organisms (GMO's), non-GMO, organic, pesticide-free, or in accordance with other crop attributes. Inedible crops may include crops such as fiber, cotton or rubber, for example. Genetically modified crops may include vegetables that are genetically manipulated to hold their shelf life longer than traditionally cultivated vegetables. Organic crops are harvested from plants that are grown without exposure to certain pesticides, herbicides or other chemicals.

Crops may be grown to specific crop attributes or specifications. Crop attributes may be based on the genetic composition of a crop, the growing practices for a crop, or both. For example, a certain variety of corn may be grown that has greater oil content than other varieties because of genetic or environmental factors. Similarly, a certain variety of soybeans may be grown that has a different protein content or other crop attribute that is desirable. A processor, a pharmaceutical company, a manufacturer or another concern may desire to purchase agricultural products with specific crop attributes from a grower or another supplier. The grower or supplier may wish to charge a premium for crops with specific crop attributes compared to a commodity-type crop. The purchaser of the agricultural product may desire sufficient assurance that the agricultural product that is being purchased actually possesses the crop attributes that are sought.

Thus, a need exists to accurately identify crops with specific crop attributes throughout the growing and distribution of crops with specific crop attributes and any products derived therefrom. Further, a purchaser of an agricultural product or a crop may desire or demand the ability to trace the identity of the crop with specific crop attributes to verify the presence of the crop attributes, or the absence of undesired attributes, as a condition for a commercial transaction.

Accordingly, there is a need to segregate crops during harvesting such that no mixing of crops or crop residue with different attributes occurs. After unloading a combine grain compartment, there may be grain and residue left in the lower portions of the grain compartment and in the unloader tube that cannot be easily mechanically removed. The present inventors have recognized that in order to ensure segregation of crops with different attributes, it would be desirable if the combine was able to be thoroughly cleaned of grain and residue between harvesting of crops of different attributes.

Presently, to thoroughly clean grain compartments, the operator must sometimes crawl into a very small space that is not accessible from the ground and vacuum out or sweep out the grain and residue. During the cleanout of the grain tank, it is difficult to clean under the cross auger covers and in hidden areas of the tank as well. It is also difficult to clean, and verify adequate cleaning of, unloader tubes because of limited access and no effective method to inspect the tube for adequate cleaning. The typical time and effort to completely remove all the grain and residue from the combine, particularly from the grain tank and unloader tube, is very long and the task difficult.

The present inventors have recognized that it would be desirable if the grain compartment and unloader tube of a harvesting apparatus could be more easily and quickly thoroughly cleaned, minimizing the need to vacuum out or sweep out grain or residue.

SUMMARY OF THE INVENTION

The invention provides an auxiliary rotary drive for at least one auger that in normal operation is rotatable to transport grain from a grain tank of a harvesting apparatus. The auxiliary rotary drive is configured to rotate the at least one auger during cleanout to assist air nozzles or other means to remove residual grain or residue from the harvesting apparatus. The auxiliary rotary drive can be arranged to transfer power to the auger via a clutch arrangement arranged between the auxiliary rotary drive and the auger. The auxiliary rotary drive has sufficient power to turn the auger via the clutch arrangement. Preferably, the auxiliary rotary drive turns the auger at a speed slower than a normal operating speed of the auger.

According to an exemplary embodiment of the invention, the auxiliary rotary drive is in an off condition during normal operation of the auger. The auxiliary rotary drive preferably comprises an electric motor. The clutch arrangement preferably comprises a drive sheave fixed to a rotary output shaft of the drive, an input pulley rotationally coupled to the auger, and a belt coupled to the output and input pulleys.

The clutch arrangement further comprises a belt tensioning system operatively connected to tension the belt. The belt tensioning system comprises a cylinder operative to increase the distance between the input and output pulleys to tension the belt. The system further comprises an operator-actuated switch for activating the auxiliary rotary drive and the belt tensioning system. The operator-actuated switch comprises an elongated cable having a switch element at an end of the cable.

A control system can be provided, the control system including the operator-actuated switch, a timer, and an audible alarm. The control system can be configured such that once the operator-actuated switch is actuated, the timer delays operation of the auxiliary rotary drive for a preselected time during which time the audible alarm sounds.

The system is preferably configured for turning the unloader auger and grain tank cross augers during cleaning to assist in cleaning out the grain tank and unloader tube. A sequence and method for triggering mechanical parts to turn is provided. The system provides a method of jogging the system for cleanout. During actuation, the system incorporates a delay and simultaneous audible alarm. The unloader tube and grain tank cross auger areas are blown clean without risk of entanglement.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
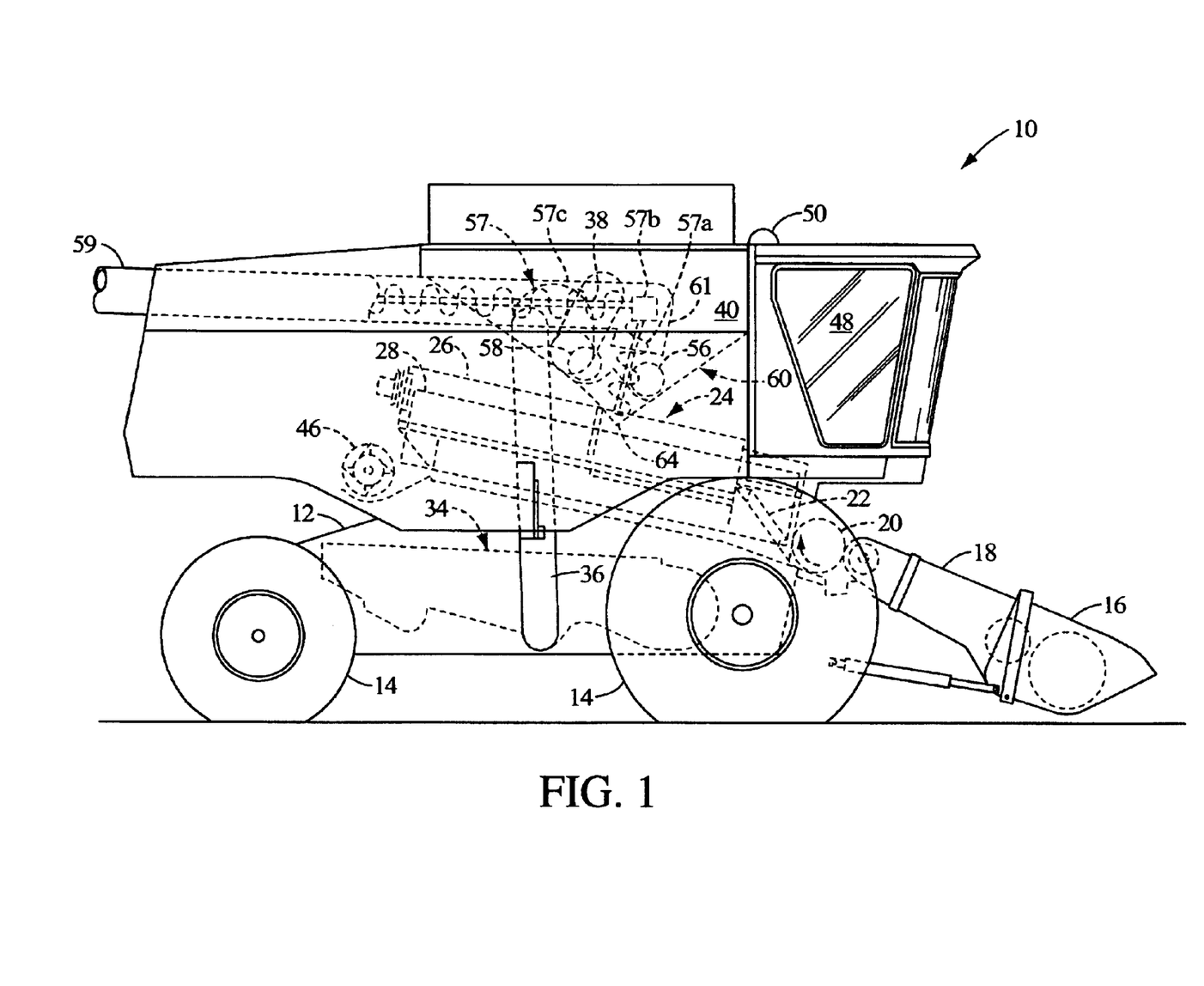
FIG. 1 is a schematical side view of a harvesting apparatus that incorporates the present invention.
Figure 2:
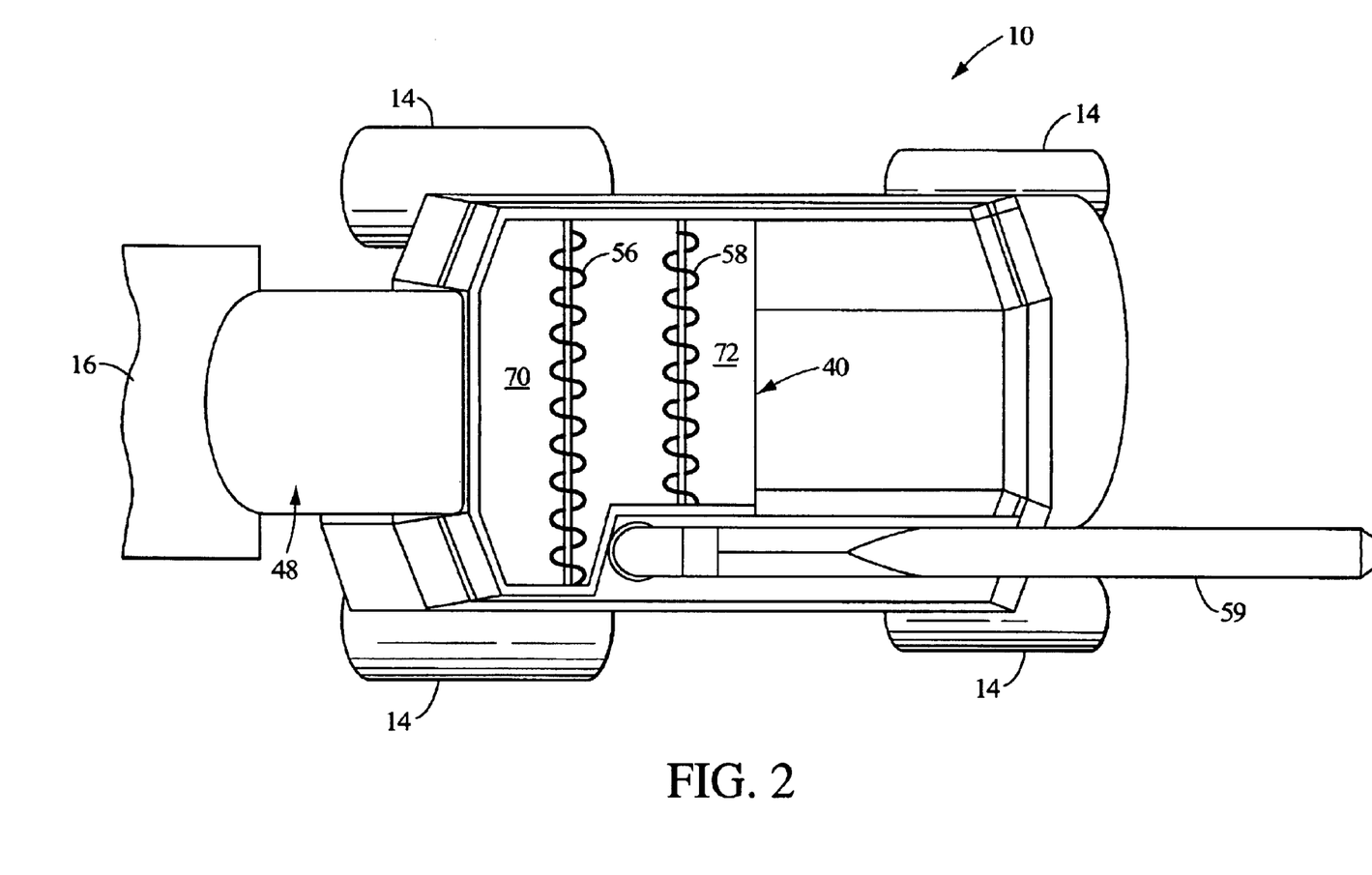
FIG. 2 is a schematical plan view of the harvesting apparatus of FIG. 1.

FIGS. 1 and 2 illustrate a harvesting apparatus, such as an agricultural combine 10. Such combines are of a type described for example in U.S. Pat. No. 6,285,198, herein incorporated by reference, and are also of the type commercially available as a JOHN DEERE 9650 STS or 9750 STS combine. Although the invention is being described as being incorporated into a rotary combine, it may also be used on other combines, such as conventional straw walker machines.

FIG. 1 shows an agricultural combine 10, also known as a combine thresher. The combine 10 comprises a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24. The axial crop processing unit is located between, and supported by the sidesheets of the combine.

The axial crop processing unit 24 comprises an axial rotor housing 26 and an axial rotor 28 located in the housing. The harvested crop enters the housing through the inlet transition section 22. The rotor is provided with an infeed portion, a threshing portion and a separating portion. The rotor housing has a corresponding infeed section, a threshing section and a separating section.

Both crop processing portions, the threshing portion and the separating portion, are provided with crop engaging assemblies. The threshing section of the rotor housing is provided with a concave and the separating section is provided with a grate. Grain and chaff released from the crop mat falls through the concave and the grate. The concave and grate prevent the passage of crop material larger than grain or chaff from entering the cleaning system 34.

As illustrated in FIG. 1, grain and chaff falling through the concave and grate is directed to cleaning system 34 which removes the chaff from the grain. The clean grain is then directed by a clean grain elevator 36 to a fountain auger 38. The fountain auger 38 directs the grain into a grain tank or grain compartment 40. The clean grain elevator 36 and the fountain auger 38 comprise a means for moving the clean grain from the grain floor of the combine to a storage bin formed by the grain tank 40. The grain is removed from the grain tank 40 by unloading auger 57. As the straw reaches the end of the crop processing unit it is expelled through an outlet to a beater 46. The beater 46 propels the straw out the rear of the combine. The operation of the combine is controlled from the operator's cab 48.

When the clean grain compartment 40 is to be unloaded, transverse unloading augers 56 and 58 direct the grain to the side of the compartment where it comes into contact with an unloading auger 57 which directs the clean grain through a vertical unloading tube 61 and a horizontal unloading tube 59. The auger 57 includes a vertical section 57a, at least partially within the tube 61, a right angle gear 57b, and a horizontal section 57c within the tube 59. During an unloading operation, tube 59 would normally be extended outwardly from the side of the combine so that clean grain can be more readily directed into a wagon or truck.

Figure 5:
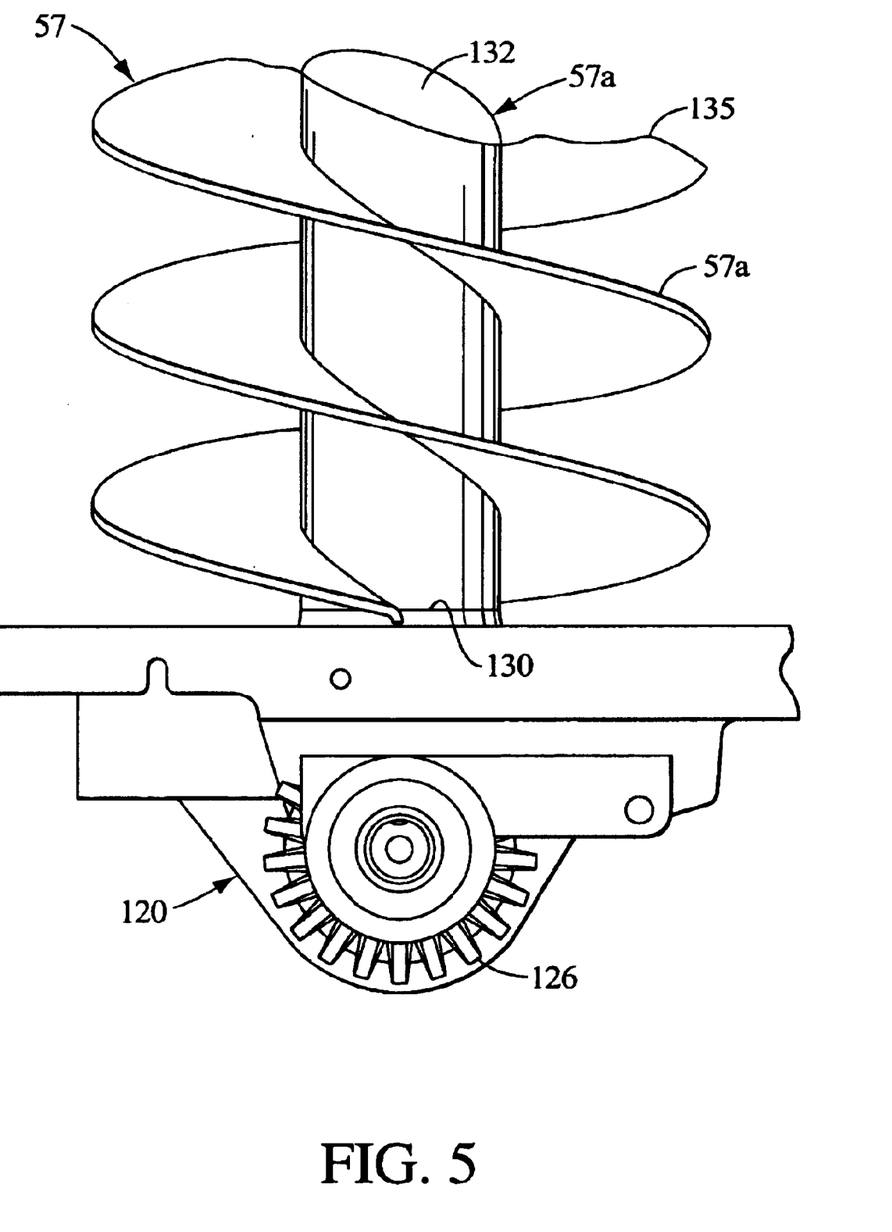
FIG. 5 is a sectional view taken generally along line 5—5 of FIG. 2.

The grain compartment 40 includes a trough 60, which includes a major trough region 70 and a minor trough region 72 that house the horizontal augers 56, 58, respectively. The trough 60 is open to a charge housing or sump 64. The vertical auger section 57a extends through the vertical tube 61 and into the sump 64 (see FIG. 5). The grain which is fed through the trough horizontally by the horizontal augers 56, 58 is delivered into the sump 64 and is removed by the vertical auger section 57a through the tube 61, and by the horizontal auger section 57c through the tube 59.

Figure 3:
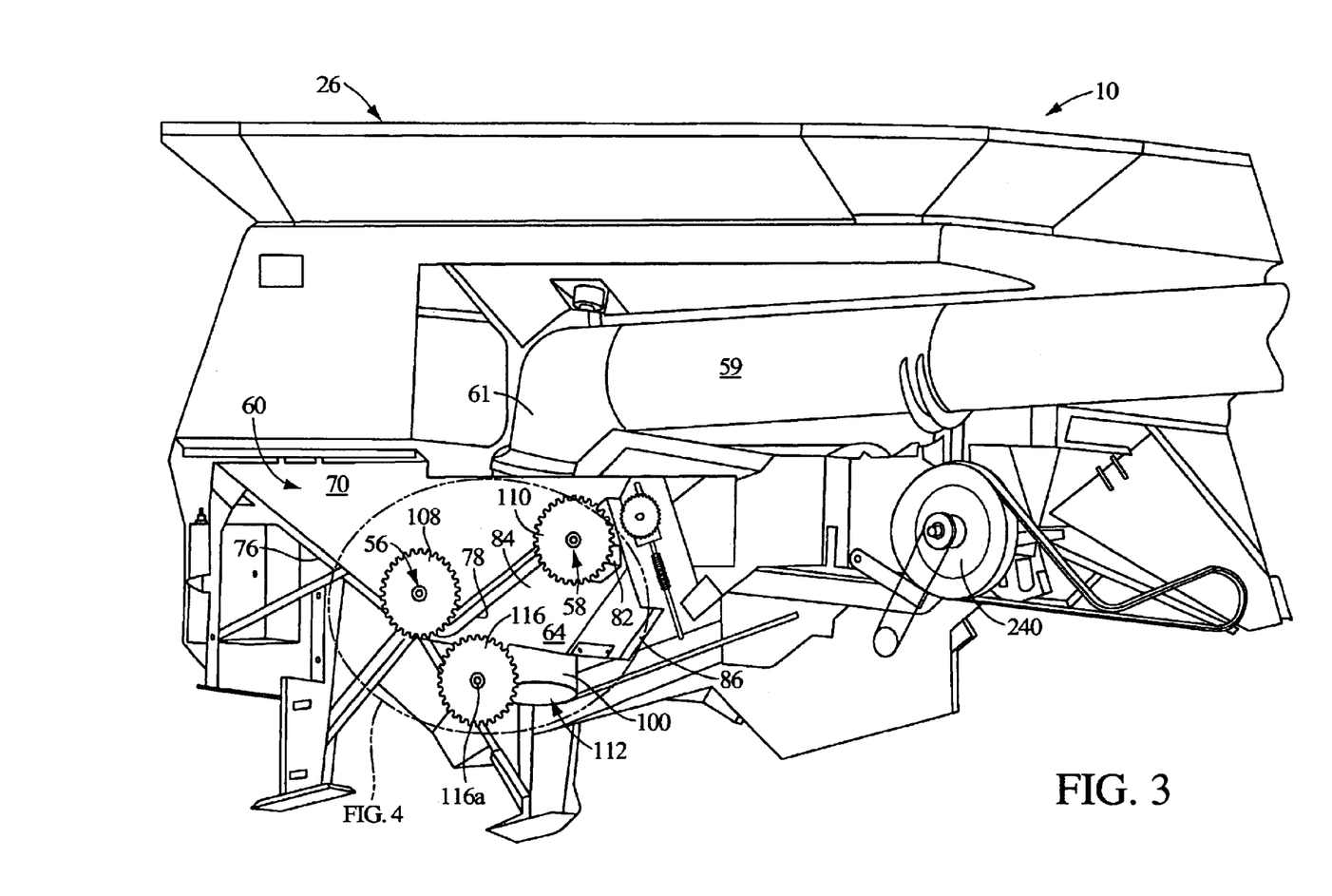
FIG. 3 is an enlarged, fragmentary perspective view of a grain compartment area of the harvesting apparatus of FIG. 1.

As illustrated in FIG. 3, the major trough region 70 includes a forward inclined wall 76 and a rearward inclined wall 78. The minor trough region 72 includes a rearward inclined wall 82 that curves into the rearward inclined wall 78 of the major trough region 70. The sump 64 includes parallel sidewalls 84 that extend substantially parallel and vertical and are fastened substantially continuously to the inclined walls 78, 82. Only the left side sump sidewall 84 is visible in the Figures, the right side sump sidewall is substantially the same shape as the left side sidewall.

The augers 56, 58 are driven by sprockets 108, 110. The auger 57 is driven by a right angle gear drive 112 that is driven by a sprocket 116 via an input shaft 116a.

One drive arrangement for turning the sprockets 108, 110, 116 for normal grain and unloading operation is described in more detail in U.S. Pat. No. 4,967,863, herein incorporated by reference, or the drive arrangement can be of the type commercially available on a JOHN DEERE 9650 STS or 9750 STS combine.

Figure 4:
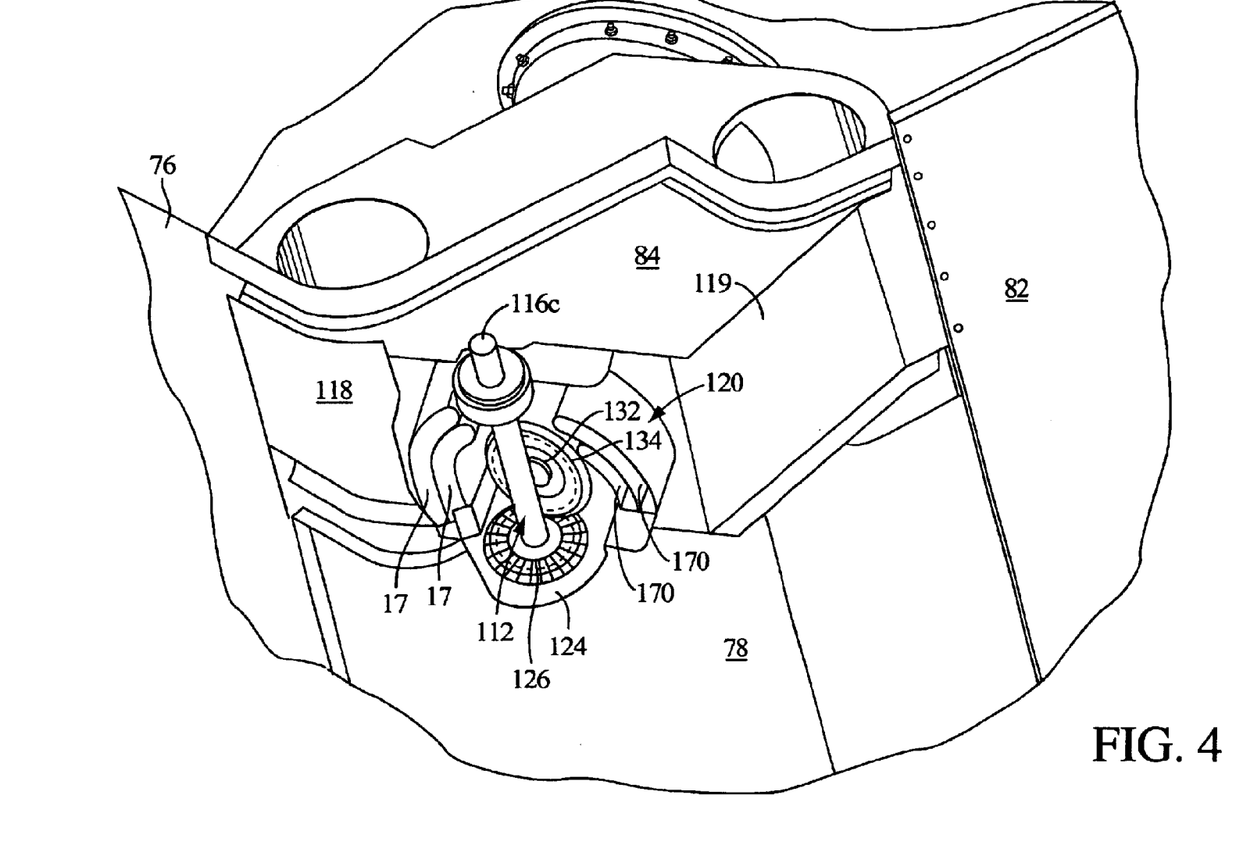
FIG. 4 is an enlarged, fragmentary bottom perspective view of the grain compartment area shown in FIG. 3.

As illustrated in FIG. 4, the sump includes a front oblique wall 118, a rear oblique wall 119, and an auger casting 120. The auger casting 120 is fastened to the oblique walls 118, 119. The front oblique wall 118 is fastened to the forward inclined wall 76 and the sidewalls 84, 86. The rear oblique wall 119 is fastened to the rearward inclined wall 82 and the sump sidewalls 84. The sump sidewalls 84, the auger casting 120, and the walls 118, 119 form a substantially enclosed sump 64 except for drain openings described below. When plugs, or covers and gaskets bolted over openings, are installed into, or onto, the casting 120, the sump 64 is substantially sealed against the trough region 70, 72.

The auger casting 120 includes journals 122, 124 for rotatably holding a horizontal axis gear assembly 126 for the right angle gear drive 112. The auger casting 120 also includes a journal 130 (FIG. 5) for supporting and rotationally holding a vertical axle 132 of the auger 57. A vertical axis gear 134 is fixed to the axle 132. Turning of the gear 134 turns the auger 57.

The auger casting 120 includes drain openings 170 that allow the lowest portion of the sump 64 to be drained of water and/or grain. In operation, gaskets and plates, or plugs close the drain openings 170. For faster cleanout of the sump 64 and trough 60, the walls 118, 119 of the sump can be replaced by a casting having grate hole patterns such as disclosed in U.S. application Ser. No. 10/309,976 filed on the same day as the present application, herein incorporated by reference.

Figure 6:
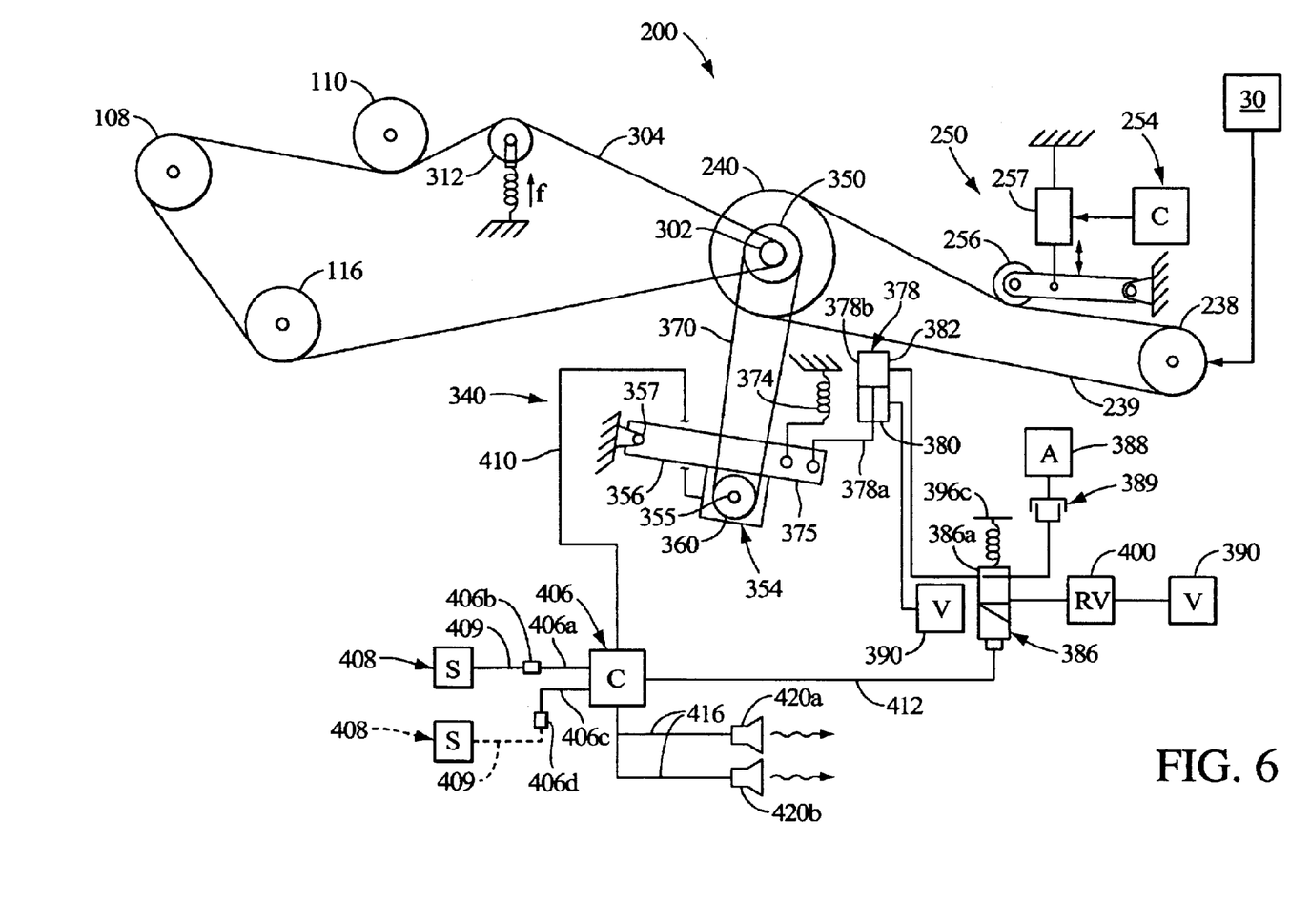
FIG. 6 is a schematic diagram of an unloading auger driving system.

FIG. 6 illustrates a drive system 200 for the clean grain unloading system. The grain unloading system is driven by a first sheave 238 that is driven by the driving means 30, as is known, such as described for example in U.S. Pat. No. 4,967,863. A belt 239 is driven by the sheave 238. When the belt 239 is taught, the belt 239 drives a second sheave 240.

A clutch arrangement 250 instigates rotary motion of the sheave 240. The clutch arrangement 250 is controlled by controls 254 in the operator's cab. A tensioning sheave 256 is selectively pressed into the belt 239 to instigate drive of the second sheave 240. The tensioning sheave 256 is driven into the belt 239 by a hydraulic cylinder 257 that is controlled by the associated controls 254.

The sheave 240 is operatively coupled to a sprocket 302 which is provided with a chain 304. The chain 304 engages sprockets 108, 110 for driving the unloading transverse augers 56, 58, and a sprocket 116 for driving the auger 57 for directing grain from the sump 64 through the vertical tube 61 and the horizontal unloading tube 59. The sprocket 312 is a spring biased tensioning sprocket for maintaining tension in the chain 304.

According to the invention, an auxiliary rotary drive 340 is provided to rotate the augers 56, 57, 58. The auxiliary rotary drive 340 includes a third sheave 350 fixedly mounted to the second sheave 240 and to the sprocket 302 to rotate therewith. A motor 354 is mounted to a lever 356 that is pivotally connected at one end 357 to a fixed structure on the combine chassis. The motor 354 includes an output shaft 355 fixed to a drive sheave 360. The motor 354 is preferably a 12 volt DC electric motor; although a pneumatic, hydraulic or other type motor is also encompassed by the invention. The motor 354 can be within a preferred range of 1/5 HP to 20 HP and 20 RPM to 200 RPM. For example the motor 354 can be a 1/5 HP motor having 135 inch pounds torque and 18.5 full load amps. By use of a gear box 354a (FIG. 8) with about a 20:1 gear ratio, the motor drives the output shaft 355 at about 80 RPM under load.

A belt 370 is wrapped around the third sheave 350 and the drive sheave 360. A spring 374 is connected between a free end portion 375 of the lever 356 and the lever end 357. A pneumatic cylinder 378 is connected between the free end portion 375 of the lever and the lever end 357. Expansion of the cylinder 378 against tension force from the spring 374 causes the lever to pivot downwardly, clockwise about the point 357, to tension the belt 370 between the sheaves 350, 360. Once tensioned, if the motor is energized, the sheave 360 drives the sheave 350 into rotation. Thus, the second sheave 240 and the sprocket 302 are also driven into rotation.

Because the motor 354 has a relatively small power output and is geared for slow output rotation, the second sheave 240 is rotated slowly. As a comparison, the augers 56, 57, 58 run at about 420 RPM during grain unloading. Under power from the motor 354 during cleanout operation, the augers 56, 57, 58 run at about 25 RPM. Such slow rotation is advantageous for a cleaning operation of the grain compartment 40, the horizontal unloader tube 59, and around the unloading augers 56, 58, 57.

The cylinder 378 includes a ram side 380 and a piston side 382. Pneumatic tubing connects the piston side 382 to a port of a solenoid valve 386. FIG. 6 shows the solenoid valve 386 in the energized position. In this position, pressurized air from a supply 388 is connected to the piston side 382. The air supply 388 can be an external supply that is connected to the piston side 382 by a quick connect coupling 389, or other type coupling. A vent to atmosphere 390 is connected to the ram side 380 of the cylinder 378. Thus, pressurized air to the piston side 382 causes an extension of a cylinder rod 378a from the cylinder body 378b. This movement tensions the belt 370. When the solenoid valve 386 is not energized, a spool 386a of the solenoid valve 386 is shifted upwardly as shown in FIG. 6, by spring force of a solenoid spring 386c, into the alternate position. In the alternate position, under force from the spring 374, the piston side 382 of the cylinder 378 compresses the air therein as the rod 378a retracts into the body 378b, the compressed air limited in pressure by a relief valve 400 that is set to vent the compressed air at about 5 psig.

An electronic control 406 includes necessary switching, 12 volt supply, and timer electronics to operate the system. The actuation switch 408 is preferably on a coiled tether cable 409 that can be plugged into the control system 406. In this regard, the control system 406 includes a cable 406a that extends to an elevated position adjacent to the grain tank top and terminates in a plug 406b. The control system also includes a cable 406c that extends to a position accessible from grade adjacent the motor 354 and terminates in a plug 406d. The tether cable 409 can be plugged into either plug 406b or 406d to operate the control system 406 via the switch 408. This allows the operator cleaning the grain tank 40 at an elevated position from grade to conveniently start or stop rotation of the augers 56, 57, 58 during cleaning, or allows an operator at grade to start or stop the augers 56, 57, 58.

The control system 406 includes a switching line 410 that selectively provides power to the motor 354. The control also provides an actuation line 412 to the solenoid valve 386. Additionally, the control system 406 provides actuation lines 416 to one or more audible alarms 420a, 420b. The switch 408 and tether cable 409 can be plugged into the system 406 at plural locations such as at ground level and at grain tank level.

The control system 406 incorporates a timer circuit or a timer relay switch to provide a delay while sounding alarms 420a, 420b.

Figure 7:
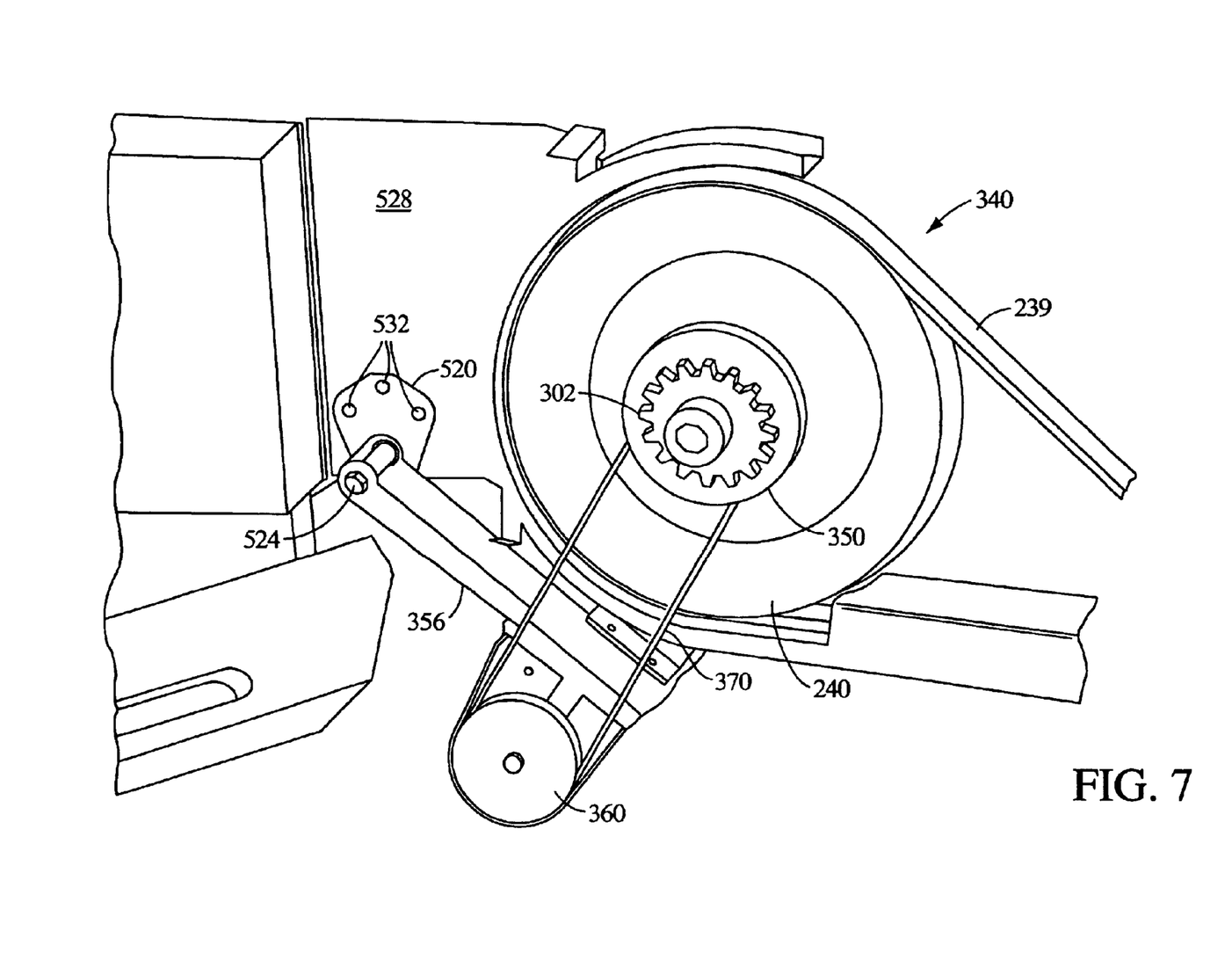
FIG. 7 is an enlarged, fragmentary, front side perspective view of an auxiliary drive system for augers.

FIG. 7 illustrates the structural configuration of the auxiliary rotary drive 340. The lever 356 is pinned for rotation to a bracket 520 by a stud/pin 524. The bracket 520 is fastened to a stationary structure 528 of the combine by fasteners 532.

Figure 8:
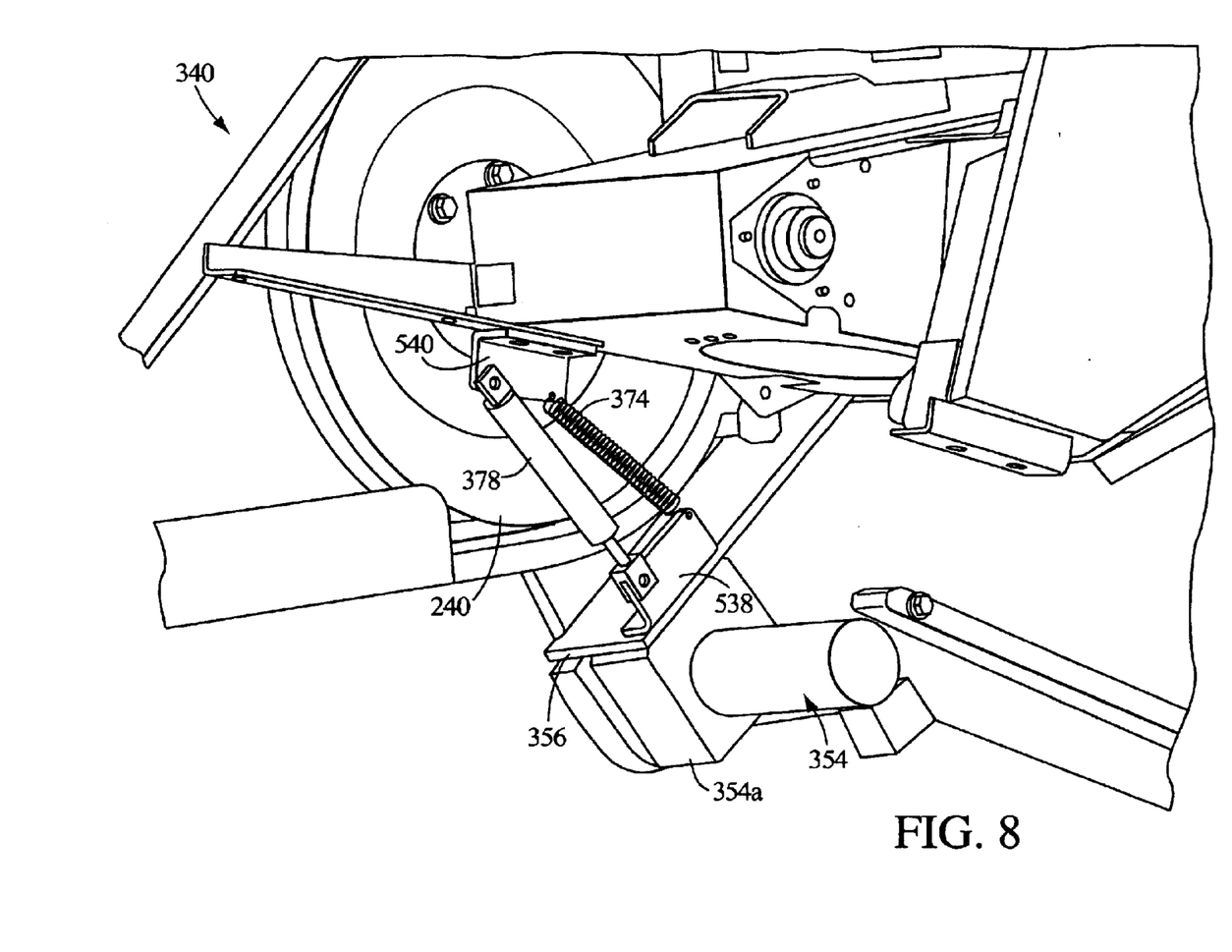
FIG. 8 is a back side perspective view of the auxiliary drive system as shown in FIG. 7.

FIG. 8 illustrates a bracket 538 fixed to the lever 356, and a bracket 540 fixed to stationary structure 542 of the combine. The cylinder 378 is connected to the brackets 538, 540 with pins or bolts (not shown). The spring 374 is also connected to the brackets 538, 540. The motor 354 can be connected to the output shaft 355 via a gearbox 354a, as necessary.

In operation, the unloader tube and grain tank cross auger areas are blown clean while the auger system is slowly turned, for efficient and quick cleaning.

A method of the invention includes engaging and disengaging the system. The procedure for engaging the system comprises the following steps:

1. A remote location is chosen to plug in the remote tether, either at ground level or and grain tank level.
2. Air is supplied to the system.
3. The remote switch 408, being a momentary switch, is manually depressed and held down.
4. Twelve volts is sent to timer circuitry and audible alarms 420a, 420b are activated for a preselected period of time, such as two seconds. During the preselected time, the motor 354 is not activated.
5. After the preselected time elapses, the timer circuitry shuts off the audible alarms and sends twelve volts to the motor 354, wherein the motor starts turning. The motor turns at about 80 RPM with the belt still loose.
8. Twelve volts are sent to the air solenoid valve 386 wherein the solenoid valve spool slides and supplies pressurized air to the air cylinder 378.
9. Air enters the piston side 382 of the air cylinder and air pressure overcomes force from the return spring 374.
10. The air cylinder ram side (380) air is vented to atmosphere through vent 390.
11. The air cylinder pushes the turning motor downward into the belt 370 and the unloader sheave 240 starts turning.

12. The unloader augers 56, 57, 58 turn at about 25 RPM due to the ratios of the sprockets.

13. Strategically positioned remote air nozzles and/or manually directed air wands, are used while the augers are turning to provide for effective cleanout. Air systems for cleanout are disclosed in U.S. application Ser. No. 10/309,978, filed on the same day as the present application, and in U.S. application Ser. No. 10/309,979, filed on the same day as the present application and both herein incorporated by reference.

The disengagement of the cleanout system is as follows:

1. The momentary tether switch 408 is de-activated by releasing finger or thumb pressure on the switch.
2. The twelve volt supply is immediately shut off to the timer circuit or element, the solenoid valve 386, and the motor 354.
3. The solenoid valve 386 shifts and shuts off air supply 388 to the cylinder 378.
4. The return spring 374 pulls the motor sheave 360 out of engagement with the belt 370 by overpowering the force of the cylinder.
5. The ram side 380 of the cylinder 378 is vented to let atmospheric air into the cylinder.
6. The air on the piston side 382 of the cylinder is pressurized back to the solenoid valve 386.
7. The air from the cylinder is pushed against the 5 PSI relief valve 400.
8. The spring-induced pressure being higher than the 5 PSI relief valve-controlled pressure, allows air to discharge, allowing the cylinder to retract.
9. The system is then effectively off.

The system of the invention provides safety advantages. The timer circuit delays the start of the moving parts of the system while audible alarms sound before the parts begin moving. Once moving, the auxiliary motor 354 turns the augers at a slow speed. The system force is relatively low. The system effectively turns off with loss of voltage or air. The system requires both air and voltage to be engaged. The air pressure has to be maintained high enough to overcome return spring force, which can be 40 pounds. The switch 408 is manually operated and is a momentary switch.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In a harvesting apparatus having a grain tank and at least one auger that is rotatable at an operating speed by a primary rotary drive to transport grain from the grain tank, the improvement comprising:

an auxiliary rotary drive engageable during cleaning of said grain tank when said primary rotary drive is disengaged from causing rotation of said auger to turn said auger at a reduced speed compared to said operating speed.

2. The improvement according to claim 1, wherein said auxiliary rotary drive is configured to rotate said auger at about 25 RPM.

3. The improvement according to claim 1, wherein said auxiliary rotary drive comprises an electric motor and a clutch arrangement arranged between said motor and said auger, said clutch arrangement for selectively applying rotational power from the motor to the auger, said motor having sufficient power to turn said auger via said clutch arrangement.

4. The improvement according to claim 1, wherein said auxiliary rotary drive comprises a motor and a clutch arrangement arranged between said motor and said auger, said motor having sufficient power to turn said auger via said clutch arrangement, wherein said clutch arrangement comprises a drive disc fixed to a rotary output shaft of said drive, an input disc coupled to said auger, and an endless traction element coupled to said output and input discs such that turning of said drive disc by said output shaft circulates said endless traction element which turns said input disc and the auger, wherein said clutch arrangement further comprises a tensioning system operatively connected to tension said endless traction element, said tensioning system comprises a pneumatic cylinder being connected at one end to a relatively stationary portion of said harvesting apparatus and being operatively connected to said motor, said pneumatic cylinder operative when charged with pressurized air to increase the distance between said input and output discs to tension said endless traction element, and said tensioning system includes a tension spring arranged between said motor and a relatively stationary portion of said harvesting apparatus to urge said motor in a direction to move said input and output discs apart to decrease tension on said endless traction element when said pneumatic cylinder is not charged with pressurized air, and further comprising an operator-actuated switch electrically signal-connected to the motor of said auxiliary rotary drive for activating said motor, and to said pneumatic cylinder of said auxiliary rotary drive via a solenoid valve that supplies pressurized air to said pneumatic cylinder when in a first state, said solenoid valve urged by a solenoid valve spring to a second state, when said auxiliary rotary drive is deactivated, wherein pressurized air from said solenoid valve to said pneumatic cylinder is terminated.

5. The improvement according to claim 1, wherein said auxiliary rotary drive comprises a motor and a clutch arrangement arranged between said motor and said auger, said motor having sufficient power to turn said auger via said clutch arrangement, wherein said clutch arrangement comprises a drive pulley fixed to a rotary output shaft of said drive, an input pulley coupled to said auger, and a belt coupled to said output and input pulleys.

6. The improvement according to claim 5, wherein said clutch arrangement further comprises a belt tensioning system operatively connected to tension said belt, said belt tensioning system comprises a lever pivotally connected at one end to a relatively stationary portion of said harvesting apparatus, said motor carried by said lever, a pneumatic cylinder connected at one end to a relatively stationary portion of said harvesting apparatus and at an opposite end to said lever, extension and retraction of said pneumatic cylinder causing pivoting of sad lever, said pneumatic cylinder operative when charged with pressurized air to increase the distance between said input and output pulleys by pivoting of said lever to tension said belt.

7. The improvement according to claim 6, wherein said belt tensioning system includes a spring arranged between said lever and a relatively stationary portion of said harvesting apparatus to urge a pivoting of said lever in a direction to move said input and output pulleys apart to decrease tension on said belt when said pneumatic cylinder is not charged with pressurized air.

8. The improvement according to claim 1, wherein said auxiliary rotary drive comprises an electric motor operatively connected to turn said auger when said auxiliary rotary drive is activated, and comprising a control, wherein said harvesting apparatus includes an outlet in electrical signal communication with said control, and an operator-actuated switch including an elongated cable having a switch element at a first end of said cable and a plug element at a second end, said switch element electrically connectable to said control via said cable when plug element is engaged to said outlet, said cable being substantially loose from said plug to said switch element for manipulation of the cable by an operator, wherein when said switch element is activated by an operator, said control issues a delayed activation command to said auxiliary rotary drive.

9. The improvement according to claim 8, wherein said harvesting apparatus includes a grain tank having an open top at an elevated level of the apparatus, and said auger is located within said grain tank, and said outlet is located on said elevated level such that an operator can see into said grain tank through said open top while activating said switch element.

10. The improvement according to claim 1, further comprising an operator-actuated switch electrically signal-connected to said auxiliary rotary drive for activating said auxiliary rotary drive, wherein said operator-actuated switch comprises an elongated cable having a switch element at an end of said cable, said switch element electrically connectable to said auxiliary rotary drive via said cable, said cable being substantially loose along its length to said switch element for manipulation of the cable by an operator.

11. The improvement according to claim 1, comprising a control having a timer, an operator-actuated switch, and an audible alarm, said control electrically signal-connected to said operator-actuated switch, to said auxiliary rotary drive and to said audible alarm such that once said switch is actuated, said timer delays operation of said auxiliary rotary drive for a pre-selected time during which time said audible alarm sounds.

12. The improvement according to claim 1, wherein said auxiliary rotary drive comprises a motor and a clutch arrangement arranged between said motor and said auger, said motor having sufficient power to turn said auger via said clutch arrangement, wherein said clutch arrangement comprises a drive disc fixed to a rotary output shaft of said drive, an input disc coupled to said auger, and an endless traction element coupled to said output and input discs such that turning of said drive disc by said output shaft circulates said endless traction element which turns said input disc and the auger, wherein said clutch arrangement further comprises a tensioning system operatively connected to tension said endless traction element, said tensioning system comprises a pneumatic cylinder being connected at one end to a relatively stationary portion of said harvesting apparatus and being operatively connected to said motor, said pneumatic cylinder operative when charged with pressurized air to increase the distance between said input and output discs to tension said endless traction element, and said tensioning system includes a spring arranged between said motor and a relatively stationary portion of said harvesting apparatus to urge said motor in a direction to move said input and output discs apart to decrease tension on said endless traction element when said pneumatic cylinder is not charged with pressurized air.

13. In a harvesting apparatus having a grain tank and at least one auger that is rotatable at an operating speed to transport grain from the grain tank, the improvement comprising:

an auxiliary rotary drive engageable during cleaning of said grain tank to turn said auger at a reduced speed compared to said operating speed;

wherein said auxiliary rotary drive comprises a motor and a clutch arrangement arranged between said motor and said auger, said motor having sufficient power to turn said auger via said clutch arrangement.

14. In a harvesting apparatus having a grain tank and at least one auger that is rotatable at an operating speed to transport grain from the grain tank, the improvement comprising:

an auxiliary rotary drive engageable during cleaning of said grain tank to turn said auger at a reduced speed compared to said operating speed;

wherein said auxiliary rotary drive comprises an electric motor.

15. In a harvesting apparatus having a grain tank and at least one auger that is rotatable at an operating speed to transport grain from the grain tank, the improvement comprising:

an auxiliary rotary drive engageable during cleaning of said grain tank to turn said auger at a reduced speed compared to said operating speed;

wherein said auxiliary rotary drive comprises a motor and a clutch arrangement arranged between said motor and said auger, said motor having sufficient power to turn said auger via said clutch arrangement, wherein said clutch arrangement comprises a drive pulley fixed to a rotary output shaft of said drive, an input pulley coupled to said auger, and a belt coupled to said output and input pulleys.

16. The improvement according to claim 15, wherein said clutch arrangement further comprises a belt tensioning system operatively connected to tension said belt.

17. The improvement according to claim 16, wherein said belt tensioning system comprises a cylinder operative to increase the distance between said input and output pulleys to tension said belt.

18. In a harvesting apparatus having a grain tank and at least one auger that is rotatable at an operating speed to transport grain from the grain tank, the improvement comprising:

an auxiliary rotary drive engageable during cleaning of said grain tank to turn said auger at a reduced speed compared to said operating speed;

further comprising an operator-actuated switch for activating said auxiliary rotary drive.

19. The improvement according to claim 18, wherein said operator-actuated switch comprises an elongated cable having a switch element at an end of said cable.

20. In a harvesting apparatus having a grain tank and at least one auger that is rotatable at an operating speed to transport grain from the grain tank, the improvement comprising:

an auxiliary rotary drive engageable during cleaning of said grain tank to turn said auger at a reduced speed compared to said operating speed; and comprising a control system, said control system including an operator-actuated switch, a timer, and an audible alarm, said control system configured such that once said operator-actuated switch is actuated, said timer delays operation of said auxiliary rotary drive for a pre-selected time during which time said audible alarm sounds.

* * * * *